(12) United States Patent
Gabryjelski

(10) Patent No.: US 8,666,230 B2
(45) Date of Patent: Mar. 4, 2014

(54) MULTIPLE PHYSICAL OPTICAL DISC FORMATS IN BACKWARDS COMPATIBLE ORDER

(75) Inventor: Henry P. Gabryjelski, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 1533 days.

(21) Appl. No.: 11/250,845

(22) Filed: Oct. 14, 2005

(65) Prior Publication Data

US 2007/0088898 A1    Apr. 19, 2007

(51) Int. Cl.
*H04N 5/92* (2006.01)
*H04N 9/80* (2006.01)
*H04N 5/84* (2006.01)
*H04N 5/89* (2006.01)

(52) U.S. Cl.
USPC ............ 386/326; 386/239; 386/248; 386/335

(58) Field of Classification Search
USPC ......... 386/105, 106, 125, 126, 232, 326–342, 386/239–248
See application file for complete search history.

(56) References Cited

U.S. PATENT DOCUMENTS

| 5,768,221 A * | 6/1998 | Kasami et al. ................... 369/14 |
| 6,523,113 B1 * | 2/2003 | Wehrenberg .................. 713/176 |
| 6,671,249 B2 * | 12/2003 | Horie .......................... 369/275.3 |
| 2003/0219224 A1 * | 11/2003 | Kim et al. ........................ 386/52 |
| 2004/0028387 A1 * | 2/2004 | Winter ............................. 386/95 |
| 2006/0024030 A1 * | 2/2006 | Hwang et al. ................... 386/95 |
| 2006/0179448 A1 * | 8/2006 | Smith et al. ................... 720/718 |
| 2006/0245331 A1 * | 11/2006 | Brondijk ......................... 369/94 |
| 2007/0050538 A1 * | 3/2007 | Northcutt et al. ............. 711/112 |

OTHER PUBLICATIONS

Mt. Fuji industry working group, Meeting Minutes, Jul. 11-12, 2005, ftp://ftp.avc-pioneer.com/Mtfuji_6/Minutes/MinJuly05-Final.pdf.
Toshiba Corporation, Proposed modification of Mt. Fuji document, "4.0 DVD model", Jul. 11, 2005, ftp://ftp.avc-pioneer.com/Mtfuji_6/Proposal/JUL05/Twin%20Format/DVDMODEL_050711.pdf.
Toshiba Corporation, Proposed modification of Mt. Fuji document, "16.4 Get Configuration command", Jul. 11, 2005, ftp://ftp.avc-pioneer.com/Mtfuji_6/Proposal/JUL05/Twin%20Format/GETCNFIG_50711.pdf.
Toshiba Corporation, Proposed modification of Mt. Fuji document, "1.0 HD DVD model", Jul. 11, 2005, ftp://ftp.avc-pioneer.com/Mtfuji_6/Proposal/JUL05/Twin%20Format/HDDVDMODEL_050711.pdf.
Toshiba Corporation, Proposed modification of Mt. Fuji document, "16.24 Read Disc Structure command", Jul. 11, 2005, ftp://ftp.avc-pioneer.com/Mtfuji_6/Proposal/JUL05/Twin%20Format/RDISCSTRC_50711.pdf.

(Continued)

*Primary Examiner* — Hung Dang
(74) *Attorney, Agent, or Firm* — Tony Azure; Andrew Sanders; Micky Minhas

(57) ABSTRACT

A mechanism that enables authoring of new optical disc physical media (e.g., HD-DVD) while maintaining backwards compatibility with previous physical media (e.g., DVD-ROM, DVD-Video). The system eliminates film system "switching" and avoids adding new commands to the command specification, while still allowing legacy (e.g., DVD-ROM) drives to use of the content on the legacy layer. The mechanism enables seamless use of any layer should the drive be able to recognize it. The system can employ a single logical block address (LBA) range together with the concept of "sessions" to effect backwards compatibility. As well, logical overwrite techniques can also be employed to accomplish seamless backwards compatibility.

23 Claims, 16 Drawing Sheets

(56) References Cited

OTHER PUBLICATIONS

Toshiba Corporation, Proposed modification of Mt. Fuji document, "16.36 Send Disc Structure command", Jul. 11, 2005, ftp://ftp.avc-pioneer.com/Mtfuji_6/Proposal/JUL05/Twin%20Format/SEND-DISC_50711.pdf.

Toshiba Corporation, Proposed modification of Mt. Fuji document, "5.0 Multiple Physical Volume Disc model", Jul. 11, 2005, ftp://ftp.avc-pioneer.com/Mtfuji_6/Proposal/JUL05/Twin%20Format/TwinDisc_050711.pdf.

Toshiba Corporation, "Proposal for Twin Format Disc", Jul. 11, 2005, ftp://ftp.avc-pioneercom/Mtfuji_6/Proposal/JUL05/Twin%20Format/Twin%20Disc_ppt.pdf.

* cited by examiner

MULTIPLE PHYSICAL OPTICAL DISC FORMATS IN BACKWARDS COMPATIBLE ORDER

BACKGROUND

Today, digital media is commonly stored on floppy disks, hard disks and optical discs. The term "disk" or "disc" refers to a round plate onto which data can be digitally encoded and thereafter retrieved. Generally, there are two basic types of computer "disks"—magnetic and optical. Both "floppy disks" and "hard disks" refer to a magnetic-type disk whereas an optical disc usually refers to a reflective plastic disc.

Similar to cassette tapes, data can be recorded on and erased from any magnetic disk as many times as desired. To the contrary, most optical discs do not share the unlimited writable and/or rewritable characteristics of the magnetic medium. Rather, some optical discs are "read only" while others are "writable." Still other optical discs are "re-writable" thereby enabling the disc to be erased and rewritten, much like a magnetic medium.

Generally, an optical disc refers to a data storage medium that includes data that can be read and/or written via lasers. Today, different types of lasers (e.g., red, blue) can be employed resulting in different storage capacity. This difference is largely owed to the wavelength associated with the laser type.

These reflective plastic platters or optical discs have become commonplace for the storage of text, audio, video as well as multi-media data. For example, the popularity of these plastic discs continues to increase in the personal computer as well as the consumer products markets. Nearly all PCs sold today are equipped with an optical drive or, alternatively, an optical drive can be added at a very nominal cost to the consumer. As well, optical discs are used commonly in other markets including, but not limited to, the music industry, the motion picture industry and the video gaming industry.

A CD-ROM (Compact Disc Read Only Memory) is a compact disc format commonly used to hold text, graphics and audio with respect to a PC. A common CD-ROM can house approximately 650 megabytes (MB) of data. This amount of data can be equated to about 250,000 pages of text or 20,000 medium-resolution images. Other CDs have become available that can house an increased amount of data.

Although similar in appearance to an audio CD, the format for recording data onto a CD-ROM is quite different. With respect to compatibility, a CD-ROM logical unit (e.g., drive) is compatible with an audio CD format and therefore can be used to play the music contained thereon. However, the converse is not true. A CD player cannot read or access data from a CD-ROM.

A CD-Recordable or CD-R is a recordable CD-ROM technology that uses a disc that can be written only a single time. Although these discs are restricted to a single write operation, they are oftentimes appendable. In other words, a user can add data to a CD-R but cannot write over existing data. As with all CDs, CD-Rs create the equivalent of pits in the disc by altering the reflectivity of a dye layer. Accordingly, a laser can be employed to read the reflectivity of the dye thereafter enabling obtaining information saved on the disc.

Because of their limited functionality and corresponding lower cost, CD-R discs are frequently used for original masters of CD-ROM material and for archiving data where rewritable functionality is not necessary. Today, to write or "burn" a complete 650 MB disc can take as little as five minutes compared to about an hour for older drives. This 650 MB capacity is equivalent to about 75 minutes of digital audio recording.

A CD-ReWritable or CD-RW refers to a rewritable CD-ROM technology. With respect to compatibility, a CD-RW drive can be used to write or burn CD-R discs. As well, a CD-RW drive can be employed to read CD-ROMs. However, because CD-RW disks have a lower reflectivity than CD-ROMs and CD-Rs, multiread CD-ROM drives are required to read them.

Unlike CD-Rs, in which the entire disc or an entire track is recorded at once, CD-RWs support Universal Disk Format (UDF), which can be equated to the file system on a hard disk. Using variable packet writing, small numbers of files can be appended, and using fixed packet writing, files can be added and deleted. The fixed packet approach requires pre-formatting like a floppy disk, but takes considerably longer.

A Digital Versatile Disc (DVD), formally Digital Video Disc, refers to a family of optical discs that share the same overall dimensions of a CD, but have significantly higher capacities. Additionally, where CDs are single-sided, DVDs may be double-sided. Recent developments have lead to dual-layer versions having two distinct layers of data per side. These discs are most often used in the music, motion picture and video gaming industries.

Similar to the CD-ROM, there are a number of varieties of DVDs. For example, a DVD-ROM can be described as a large CD-ROM that enables storage of a large amount of data, audio, video and interactive material. Similarly, for instance, a DVD±R and DVD±RW refer to the write-once and rewritable versions respectively.

A DVD±R or DVD Recordable refers to a write-once optical disk commonly used to master DVD-Video and DVD-ROM format discs. DVD±Rs are the DVD counterpart to CD-Rs and use the same dye-layer recording technology to "burn" the disc. A DVD Read Write or commonly known as a DVD±RW, refers to a type of rewritable DVD disk. Using phase change technology, the DVD±RW discs can retain up to 4.7 gigabytes (GB) per side and can be rewritten more than 1,000 times.

A DVD Video disc refers to a read-only DVD disc used for full-length movies. DVD-Video discs can hold approximately 133 minutes of full-motion video per side using MPEG-2 compression. Recent developments in technology have lead to high-definition television and subsequently, High Density Digital Versatile Discs or HD DVD.

HD-DVD refers to a digital optical media format which is being developed as one standard for high-definition DVD. With the increased popularity in high-definition television (HD TV) and transmission of HD programming, HD-DVD is increasing in demand. HD-DVD has a single layer capacity of 5 GB and a dual-layer capacity of 30 GB. Recently, other formats (e.g., Blu-Ray™) have emerged to compete with the HD-DVD standard. As such, developments have been focused upon increased storage capacity, decreased manufacturing cost and format compatibility in order to appeal to the marketplace.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention disclosed and claimed herein, in one aspect thereof, comprises a mechanism that enables authoring of and/or reading from new optical disc physical media (e.g., HD-DVD) while maintaining backwards compatibility with previous physical media (e.g., DVD-ROM, DVD-Video). Some particularly novel features of the subject innovation is that it eliminates file system "switching" and avoids adding new commands to the command specification, while still allowing legacy (e.g., DVD-ROM) drives use of the content on the legacy layer. Additionally, the novel aspects also enable seamless use of any layer should the drive be able to recognize it.

In one aspect, a hybrid disc can contain DVD-Video and HD-DVD formats. In accordance therewith, the subject innovation can facilitate seamless fallback of playback from the high-definition content found on the HD-DVD layer. For example, seamless fallback can be employed if the player or hardware does not have sufficient rights to playback the high-definition (or higher layer) content. This automatic fallback creates a seamless user experience. In order to accomplish this seamless fallback (e.g., backwards compatibility), the subject invention does not require any new commands to be added to the command specifications which can particularly simplify development.

In a particular aspect, the novel subject matter assumes a drive and media type with the concept of "sessions". It will be understood that, in accordance with conventional CD-R media, sessions allow the most recent session to contain the most up-to-date file system for the media. The concept of a session ensures that the host can automatically load the file system from the session which the drive reports as being the "last session" on the media.

In still another aspect, the multi-format system can employ an indicator, setting or flag on the media (in either area) that identifies that the media contains multiple physical formats. The physical formats can be ordered in any manner, e.g., linear, tree, or combinations thereof. In one aspect, the physical formats are "ordered" into a direct single-link hierarchy (e.g., no branches) such that support for format X implies and/or requires support for all formats following this format. By way of example, a simple case would be: HD-DVD→DVD-ROM. In this exemplary format, it is to be understood that the drive can support either DVD-ROM or both HD-DVD/DVD-ROM. Support for only HD-DVD without DVD-ROM support would not be allowed.

Yet other aspects employ branches (e.g., tree structures in addition to linear structures). In these aspects, each branch is independent of the other(s). In other words, no two areas (e.g., sessions/layers) are used in more than one branch. Still other aspects employ combinations of linear structures and tree structures.

Consider a particular aspect that employs the following tree: C→B→A. Given this structure, a media can be created which is processed by a disparate drives in different manners. In the case of a legacy drive A, this drive would only see the area of the media related to physical format A. Accordingly, the legacy drive can report a single session media. This can cause the file system on a host (e.g., computer, embedded system) to load from area A. In a second scenario, consider drive B which sees both areas A and B. Here, the drive can report a two session disc, with session 1 being area A and session 2 being area B. Since the last session is area B, the file system from area B is loaded by the host. This file system may also optionally refer to any, all, or some subset of the files found in area A. In a final scenario, drive C can see all of the areas A, B, and C. Accordingly, the drive can report a three session disc, with session 1 being area A, session 2 being area B, and session 3 being area C. Since the last session is area C, the file system from area C is loaded by the host. This file system may also optionally refer to any, all, or some subset of the files found in areas A and B.

In still other aspects, pseudo- or logical overwrite can be employed to effect backwards compatibility. This aspect enables the logical unit (e.g., drive) to acknowledge inability to write over sectors but enables the drive to pretend that they are overwritten. Accordingly, when a user reads a particular sector, the system can redirect to an alternative sector location, thus enabling seamless use of alternative file system structures.

As well, aspects exist where the "highest layer" is designated as writable. This writable layer is possible in accordance with the aspects described herein because the only entity that refers to the highest level is the entity that writes to it. In other words, creating a writable "highest level" will maintain the novel seamless backwards compatibility characteristics described herein.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION

Figure 1:
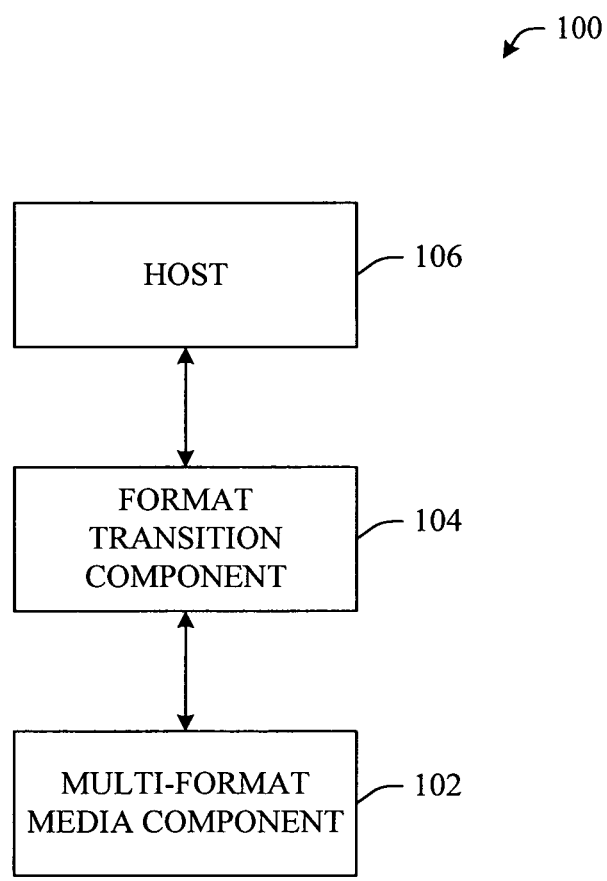
FIG. 1 illustrates a block diagram of a system that enables seamless backwards compatibility in accordance with an aspect of the innovation.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the innovation.

The following terms are used throughout the description, the definitions of which are provided herein to assist in understanding various aspects of the subject innovation.

"Format layer" refers to the layer or group of layers associated with a single physical format.

"Layer" refers to a single disc surface.

"Highest layer" refers to the layer whose technology is the most recent. For example, today, the "highest layer" would be Blue Laser technologies.

"Legacy" indicates the inability to use the highest layer on media (either codec or drive).

"Format-layer 0" refers to the most legacy layer. Currently, the "legacy layer" would refer to either a DVD-Video or CD layer.

"Exist" refers to files that are recorded in a format-layer.

"Referenced" refers to files recorded in other format-layer(s), but recorded in current format-layer's file system.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Optical discs are very common today, especially DVD discs. A new emerging technology called "Blue Laser" discs has recently emerged in BD and HD-DVD formats. The companies that are promoting these formats are in search for a transition disc that supports both the conventional formats (e.g., DVD-Video) and a new or disparate format simultaneously on a single disc. Accordingly, a user can purchase one single disc and migrate between formats automatically as desired. Moreover, the conventional proposals do not work well in the personal computer (PC) environment.

Referring initially to the drawings, FIG. 1 illustrates a system 100 that facilitates seamless transition between multiple formats encoded onto a single optical media. Generally, system 100 can include a multi-format media component 102, a format transition component 104 and a host 106. It is to be understood that, although the format transition component 104 is illustrated separate from the multi-format media component 102 and the host 106, it will be appreciated that all or a subset of the novel functionality of this format transition component 104 can be included within a host and/or logical unit. For example, the novel functionality of the format transition component 104 can be integral to a disc drive (not shown) or the host 106 without departing from the spirit and scope of the subject innovation and claims appended hereto.

The subject innovation is directed to a system 100 (and methodology) that enables multiple physical optical disc formats (e.g., CD-ROM, DVD Video, HD-DVD) to be encoded onto a single disc with seamless backwards-compatibility. For example, the novel format transition component 104 can be particularly useful in personal computer (PC) environments. One particular benefit of the subject novelty is that the seamless and/or invisible characteristics of the formatting can greatly reduce user confusion with respect to format compatibility.

As will be described in greater detail infra, the subject format transition component 104 does not require new system commands thus, operating system and other software switches are not required to access multiple layers of a disc. It will be appreciated that conventional proposals required command and coding changes in order to enable multiple format compatibility. These conventional implementations lead to a great amount of user confusion as well as system crashes and errors due to restricted compatibility with respect to format swapping.

It will further be appreciated that, in accordance with the novelty of the subject system 100, speed can be greatly enhanced as multiple layers do not have to be read at spin-up time. In accordance with aspects of the invention, this novel functionality can be accomplished by employing logical block addressing (LBA), session numbering and/or ordering techniques. It is to be understood and appreciated that "ordering" does not necessarily refer to physical layers. For example, CD-Audio can be equated to 0, DVD-ROM can be equated to 1, and HD-DVD can be equated to 2. As well, disparate formats can be saved on a single layer. Each of these techniques will be described in greater detail below.

The novel mechanisms of the subject innovation include the ability to access both (or multiple) layers of the multi-format media component 102, simultaneously in a single contiguous LBA space. As stated above, one of the benefits of the subject innovation is that there are no required modifications to read/write commands. As well, in some aspects, there is no switching of physical layers so the file system does not change thus; there is very little user confusion likely to occur.

The subject innovation can facilitate a single view of an entire disk (e.g., multi-format media component 102) that includes multiple disparate formatted data contained thereon. Accordingly, the format transition component 104 (e.g., drive) can switch between layers to read the information when it is requested or needed. This switching occurs seamlessly irrespective of the resident format(s) of a particular layer.

As will be described in greater detail below, the innovation involves both drive implementations as well as software implementations. From a software host side, there is no need to know that this formatting structure is being implemented. Thus, the operating system and/or applications do not need to be altered to conform to the novel multi-layer format structure of the subject innovation. In other words, everything that is legacy will automatically be compatible with the novel functionality described herein. A large portion of the changes can be employed in the drive itself.

Consider a simple example of a two physical layer format disk (e.g., multi-format media component 102). More particularly, consider an example two-layer or "twin format" disk where one layer is a DVD-Video layer and a second layer is a "Blue Laser" video layer. In the example, the existing DVD-Video layer cannot be changed for a number of reasons. For example, the DVD-Video layer cannot be changed for backwards compatibility. As well, and as will be appreciated by those skilled in the art, the DVD-Video layer cannot be changed since, by design, the DVD video layer has specific predefined absolute LBA numbers encoded directly into the media. For at least this reason, the system cannot change the DVD-Video layer at all for a multi-layer single view command system. Therefore, in this example, all changes must occur in the second and/or subsequent/higher layers.

A first novel concept is to extend the LBAs so that the DVD-Video layer would be from sectors 0 to N, where N is an integer. Consequently, the other layer would have to have some other predefined set of LBAs thereby making them locatable. As will be understood, the method that current file systems employ that read from 0 or alternatively, read from a fixed offset from the last session, are commonly referred to a "multi-session" methods of locating data.

A particular novel idea of the subject innovation is for the drive to present each of the physical format layers as a single session or set of sessions. Thus, when a hybrid-disk is inserted into a legacy drive, the drive would only see data compatible to the legacy drive. In other words, the drive would only see the first layer and the file system would be completely coherent.

On the other hand, when this hybrid-media (e.g., optical disk, multi-format media component 102) is inserted into a drive that supports the hybrid-media, the drive or format transition component 104 can automatically identify two sessions (e.g., formats). Accordingly, the drive can identify a starting LBA address (e.g., X) for the second format layer, where X is the starting sector for the second physical format layer. Thus, in order to locate files, once the starting sector is identified, the drive can automatically cause the file system to read from the X+offset LBA addresses.

Thus by imitating "multi-session" characteristics, the host 106 (e.g., PC side of the system) will be enabled to read the multiple physical formats from the multi-format media component 102. In other words, the host 106 will automatically pick up all the files via the logical unit (e.g., drive) because they are listed in a second session. However, some of the new formats have explicitly disallowed the use of "multi-sessions."

Therefore, an alternative novel concept can be employed to effect seamless backwards compatibility between formats. This alternative concept employs the application of "pseudo-overwrite" (POW) or "logical-overwrite" (LOW). This aspect enables the logical drive (e.g., format transition component 104) to acknowledge inability to write over sectors but enables the drive to pretend that they are overwritten. Accordingly, when a user attempts to read a particular sector, the system can automatically redirect to an alternative sector location. Therefore, with the POW aspect, rather than having multi-sessions and because the file system location is in a well known location, the system can redirect any reads (for example, for LBA 0 through 512) to another location (for example, LBA X through X+512). Thus, compatibility can be retained without any changes to the host 106, software, etc.

In another aspect, this novel functionality can be applied to multi-physical layer technologies. For example, the system can define which layers can be read, which layers cannot be read, etc. In this case, if an attempt is made to read from an unsupported format, an error can be rendered.

Additionally, there is no restriction as to what type of formatted media can be used. For example, the novel aspects of the invention can be employed with any format combinations including, but not limited to, CD-audio/DVD video, CD-audio/Blue Laser, DVD video/HD-DVD video, etc. In one aspect of the invention, it will be understood that these combinations can be viewed as a linear support layer. In other words, if a system supports one layer, it can also automatically support the layer beneath it.

As will be described in much greater detail below with reference to FIGS. 10A-C, 13A-C and 14A-B, the system can also support a tree-like structure. For example, there might be DVD, HD-DVD and Blue Laser all available in one physical media. In this system, the configuration can be set up whereas the DVD layer can be layer 1 and the system can then see either the HD-DVD or Blue Laser layer, but not both. Therefore, it is to be understood that the novel aspects of the subject innovation can be employed in any tree-view structure. Moreover, other complex graphs can employed without departing from the spirit and scope of this disclosure and claims appended hereto.

In another example, a writeable layer, or layers can be provided. In other words, it is possible to enable the highest layer (or group of layers) to be writeable. In one aspect, this would be restricted to the highest layer because it would not be prudent to change the LBA range or location of the existing files to change in the lower layers because the files in the higher ranges can refer to those files. It will be understood that the highest layer can be written upon because the only entity relying upon it is the entity writing to it. Therefore, if any changes are made to the highest layer, an entity that can access that layer will also see those changes.

Figure 2A:
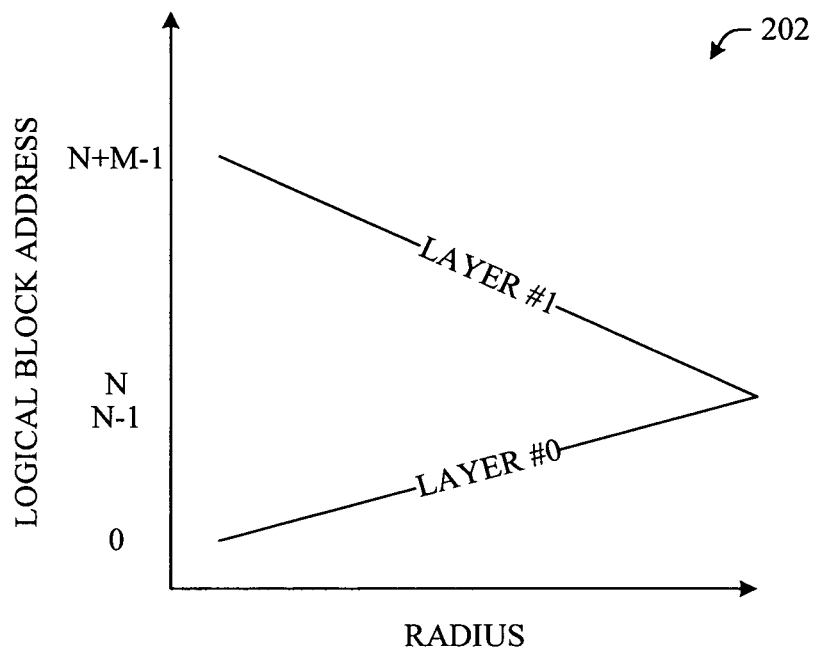
FIG. 2A illustrates a graphical representation of a two format opposite track path (OTP) multi-format configuration in accordance with an aspect of the innovation.
Figure 2B:
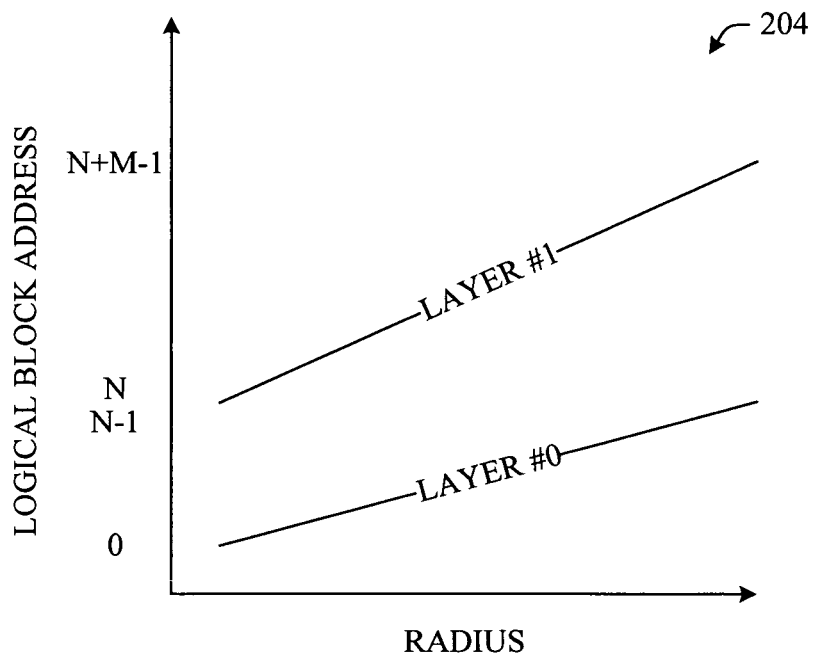
FIG. 2B illustrates a graphical representation of a two format parallel track path (PTP) multi-format configuration in accordance with an aspect of the innovation.

FIGS. 2A and 2B illustrate graphical representations 200 and 202 respectively of a multi-layer disc structure (e.g., layer #0 and layer #1) in accordance with aspects of the invention. As illustrated in both FIGS. 2A and 2B, the x-axis can be representative of a disc radius whereas the y-axis can be representative of an LBA. In accordance with aspects of the format transition component 104, LBAs can be assigned to each layer sequentially.

Referring first to the opposite track path (OTP) graphical representation of FIG. 2A, the first layer, Layer #0, can be assigned to LBA 0 through N−1. As shown, in accordance with FIG. 2A, the radius increases as the LBA increases with respect to Layer #0. Continuing with the example, the second layer, Layer #1, can be assigned to LBA N through N+M−1. It should be noted that, in accordance with the aspect of FIG. 2A, the radius decreases with respect to Layer #1 as the LBA range increases. Although only two disparate layers are illustrated, it is to be understood and appreciated that subsequent layers, e.g., Layer #2, can be designated sequential LBA locations. In this example, Layer #3 (not shown) would range from N+M to N+M+P−1, and so on.

An alternative parallel track path (PTP) aspect is shown in FIG. 2B. In particular, FIG. 2B illustrates a second layer, Layer #1, whereas the radius on the disk increases with the LBA range. It is to be understood and appreciated that one novel aspect of the innovation is the assignment of particular LBA ranges per layer. A better understanding of the novel seamless integration of employing multiple formats on a single optical disc will be appreciated upon a review of the figures that follow. As well, generally, two mechanisms are employed to effect seamless integration, multi-session and logical or pseudo-overwrite. Each of these mechanisms will be described in greater detail infra.

It will be understood that the format transition component 104 of FIG. 1 can facilitate interoperability between layers and/or formats. For example, in one aspect, mastering is employed for all but the highest layer. It will be understood and appreciated that this mastering can ensure file system restrictions for the highest layer followed. As well, it will be understood upon a review of the discussion that follows that the final (e.g., highest) layer can be writable or ROM. Essentially, this layer can be writable since, as the highest layer, it is not referred to by any other layer.

Because of the nature of the novelty, artwork can be applied to the complete disc surface. It will be understood that existing combinations and techniques use one side per format, which prevents significant artwork from being used on the media. As well, access to legacy format(s) can be facilitated without new/modified codec, drive changes, or user interaction. In the instance of a drive or logical unit that cannot comprehend the novel formatting mechanisms, a user can simply replace the drive or logical unit without replacing the complete PC.

It is to be understood that it is not necessary for the LBA range of the second or higher layer to start at one address higher than the LBA of the layer beneath it. In other words, any arbitrary offset can be employed in accordance with alternative aspects. It will be appreciated that novel functionality allows for enhancements particularly directed to consumer players.

Referring to the example illustrated in FIGS. 2A and 2B, in each aspect, the LBA range of the first and second layers are 0 through N and N+1 through N+M−1 respectively. This would require knowledge by the higher layer to know and encode the capacity of the lower layer or the laser would have to re-focus and read the capacity on the lower layer to figure out how far to offset. In a consumer device, it is particularly useful to keep the configuration and logic as simple as possible. Since there is a known maximum value for each physical format type, it is possible for the system to predetermine a configuration based upon desired physical formats. For example, DVD's can not be more than approximately 8.7 gigabytes. Therefore, it can be possible to reserve the DVD layer to 9 gigabytes.

It has also been contemplated that this solution can be employed with existing copy protection systems (e.g., content scrambling system (CSS) used on DVD-Video). As will be understood, CSS can restrict sectors until a desired authentication between the software and drive occurs. Basically, the software (e.g., host 106 of FIG. 1) can send a key to instruct the drive (e.g., format transition component 104 of FIG. 1) to unlock media located at specified sectors of the media (e.g., multi-format media component 102 of FIG. 1). As a result, the sectors can be read.

Emerging media employ a two-way authentication method which can also be employed with the subject novel innovation. Accordingly, the drive will pass data whereas both the drive and the host will perform a function on the data thereafter independently arriving with a key. The key can then be utilized to secure conversations between the drive and the host to allow the reading from particular secure sectors. It will be appreciated that this is commonly referred to as the advanced access content system (AACS). Further, it is to be understood that a combination of both copy protection systems (CSS and AACS) can coexist in accordance with aspects of this novel system.

The innovation allows the decision of what files will be viewable on new drives to be made when the image is mastered. For example, in a mastered environment such as mass producing a motion picture, the hierarchical decision can be made upon mastering the image or motion picture. As such, rules can be set up in the logical unit such that the entire first layer can be written and not re-writable. In this scenario, a decision can be made when writing the data which dictates that, if files on an upper layer can be read by a drive, the drive will not be permitted to read files on the lower level. This decision can be delayed until the creation of the disk.

To the contrary, existing and conventional systems have a command that instructs the "switch" to the DVD-Video layer. Therefore, only the DVD-Video layer can be accessed. Similarly, a command can be sent to only access the blue laser layer. Thus, the drive will act as if the disk is ejected and a Blue Laser disk is inserted. As such, the DVD-Video layer will not be able to be read. Clearly, this is limitation of conventional systems.

A particularly large problem with this conventional solution is that different drives will default to different layers. Therefore, the user experience will be subjected to confusion because the user will see some files and not others. As well, in accordance with conventional systems, the file system can suddenly change when the drive simulates an ejection of the disk and reinsertion of a disparate physical format. Similarly, in the situation when a user is employing some files and pauses and decides to play a movie, the drive will switch layers to play the movie and subsequently crash instead of automatically switching the layer back. In this scenario, suddenly the files that the user is employing are no longer available since the drive switched layers.

Figure 3:
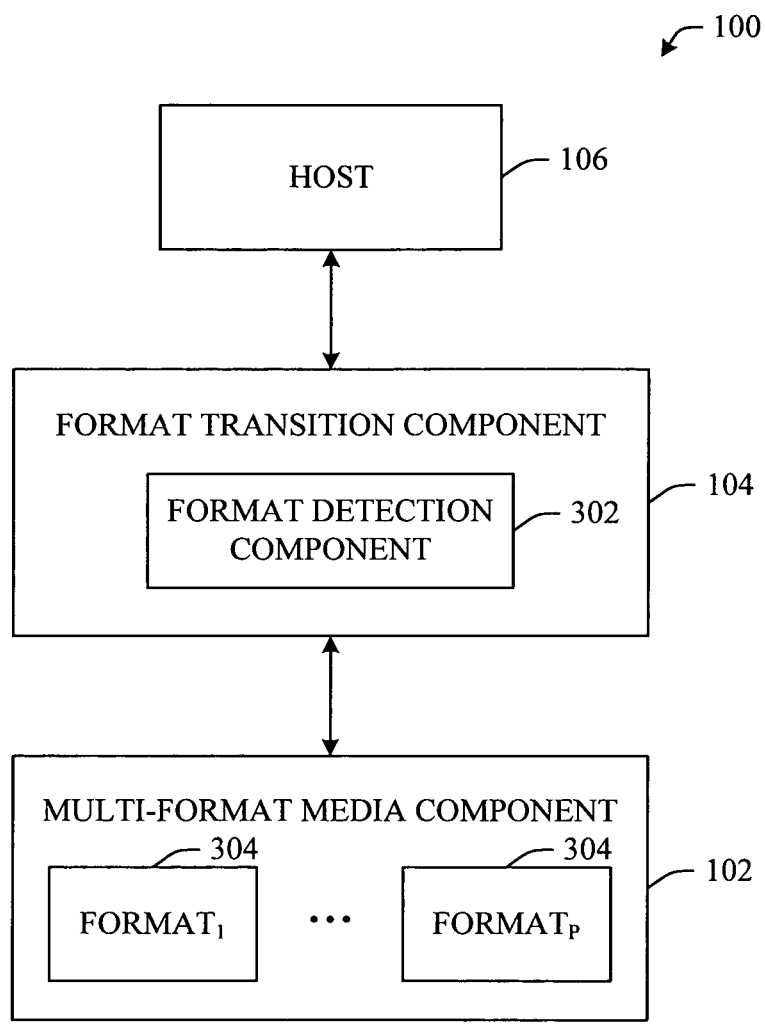
FIG. 3 illustrates an alternative architectural block diagram of a system having a format detection component that facilitates backwards compatibility in accordance with an aspect of the novel innovation.

Referring now to FIG. 3, an alternative architectural block diagram of system 100 that facilitates backwards compatibility of multiple physical formats on a single optical medium is shown. As illustrated, format transition component 104 can include a format detection component 302 capable of recognizing multiple formats contained within the multi-format media component 102.

The multi-format media component 102 can include 1 to P formats (or layers), where P is an integer. It is to be understood and appreciated that 1 to P formats can be referred to individually or collectively as format components 304. For example, format 304 can include but, are not limited to, CD-ROM, DVD-Video, HD-DVD or the like. It is to be understood that, in one aspect, all layers 304 other than format layer 0 will start at an LBA not equal to zero. Additionally, in the aspect, all layers will start at predefined and/or fixed LBAs. In other words, variable-length layers are treated as fixed-length to simplify logical unit logic when mounting such a disc.

Figure 4:
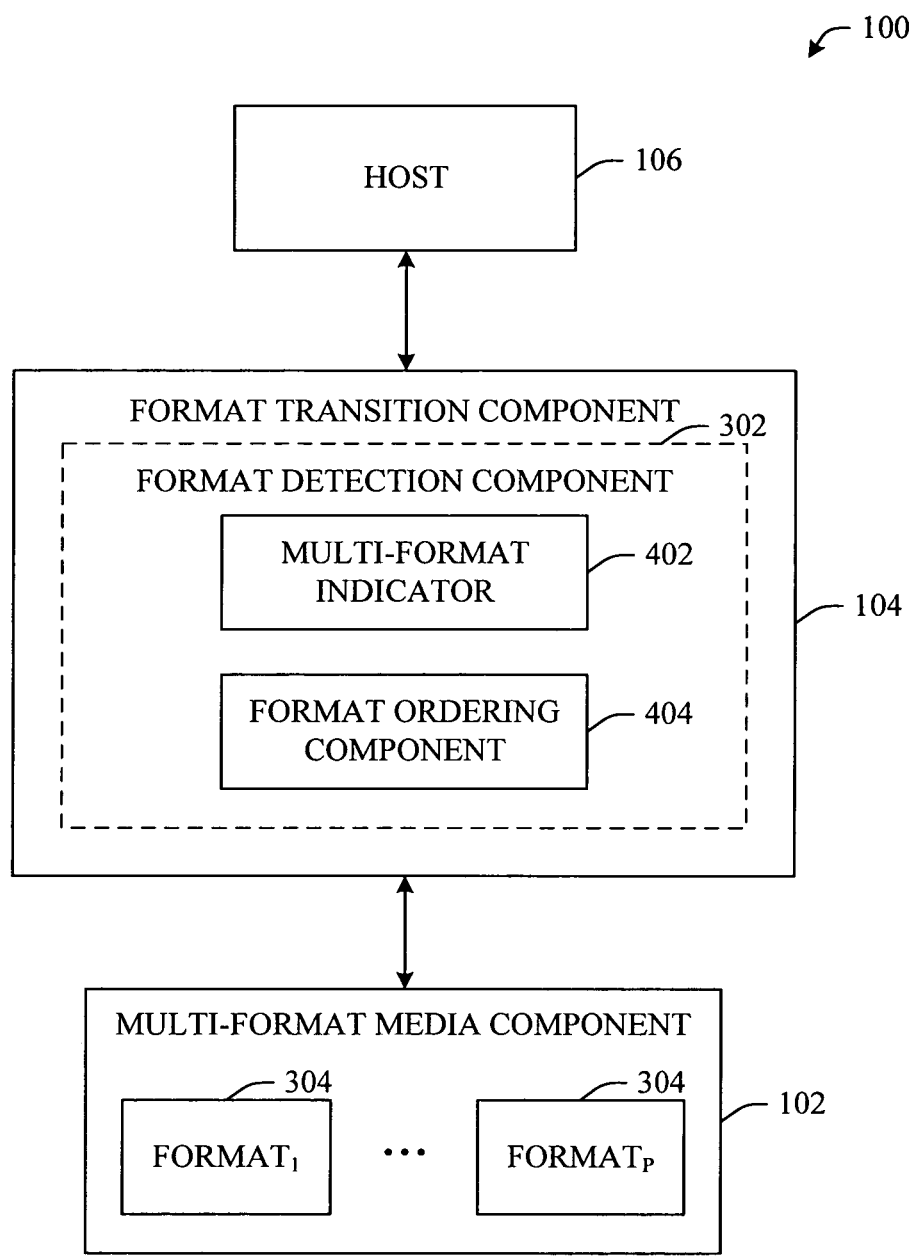
FIG. 4 illustrates an exemplary block diagram of a system that employs a multi-format indicator and a format ordering component to effect backwards compatibility.

FIG. 4 illustrates still another architectural block diagram of system 100 in accordance with an aspect of a backwards compatible format system. In particular, the system 100 illustrated in FIG. 4 includes a format detection component 302 that employs a multi-format indicator 402 and format ordering component 404. Although the multi-format indicator 402 and the format ordering component 404 are illustrated inclusive of the format detection component 302, it is to be understood that either or both of these components (402, 404) can be within the multi-format media component 102.

In operation, the multi-format indicator 402 can facilitate identification of the presence of multiple formats 304 in multi-format media component 102. For example, in one aspect, the multi-format indicator 402 can be a flag or group of flags that facilitate identification of the presence of multiple formats. Accordingly, format ordering component 404 can be facilitated to identify an order and/or hierarchy of formats 304. For example, the format ordering component 404 can be employed to identify and/or designate the highest layer in a multi-layer scenario.

Additionally, other information can be stored within the layer 304. For example the start LBA for a current layer, the start session number (for a multi-session aspect), other layer types and physical layer groups can be identified within each layer 304. Moreover, it is to be understood that files contained in earlier format layers 304 can optionally appear in later format layers 304. This inclusion decision can be made at the mastering process time.

The format transition component 104 can facilitate the host 106 in seamlessly and simultaneously rendering all files on the multi-format media component 102 thereby reducing user confusion. As will be understood upon a more detailed review of the figures that follow, the use of a single global LBA range together with the multi-format indicator 402 and the format ordering component 404 enable seamless transition between disparate formats contained within one optical medium (e.g., 102). Moreover, user confusion can be substantially reduced and/or eliminated by providing a mechanism to update the file system for drives that support new layers. As will be described, two scenarios that can be employed to update the file system are provided herein in order to provide context to the invention, multi-session and pseudo-overwrite mechanism(s).

Figure 5:
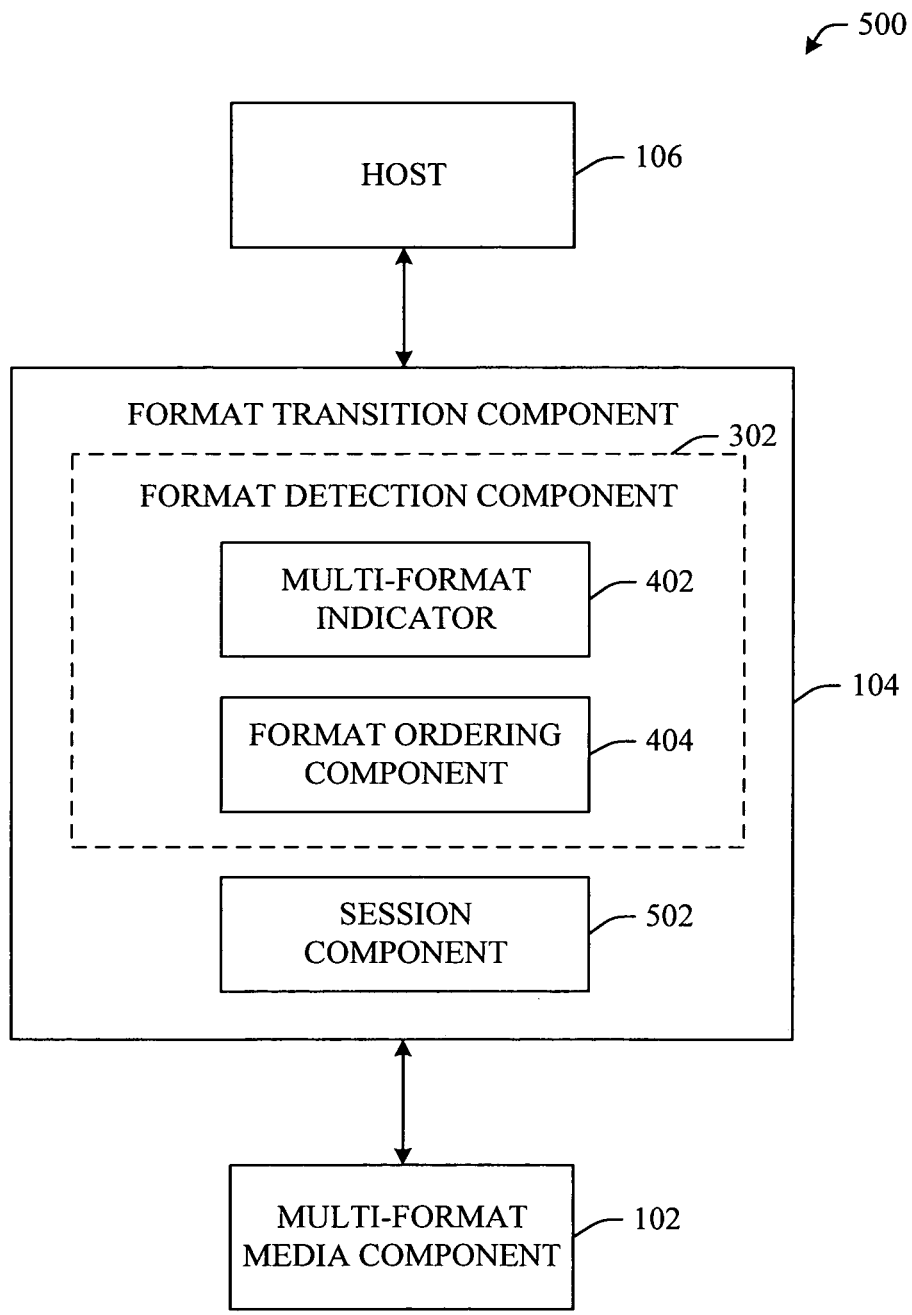
FIG. 5 illustrates a block diagram of a system that employs a multi-session technique to effect backwards compatibility in accordance with an aspect of the innovation.

Turning now to FIG. 5, a multi-session system 500 is illustrated in accordance with an aspect of the innovation. This multi-session system 500 can be most often employed to switch to other layers if files are not referenced in higher layers. As shown in FIG. 5, the format transition component 302 can further include a session component 502. The session component 502 can facilitate tracking sessions with respect to formats and/or layers.

Figure 6:
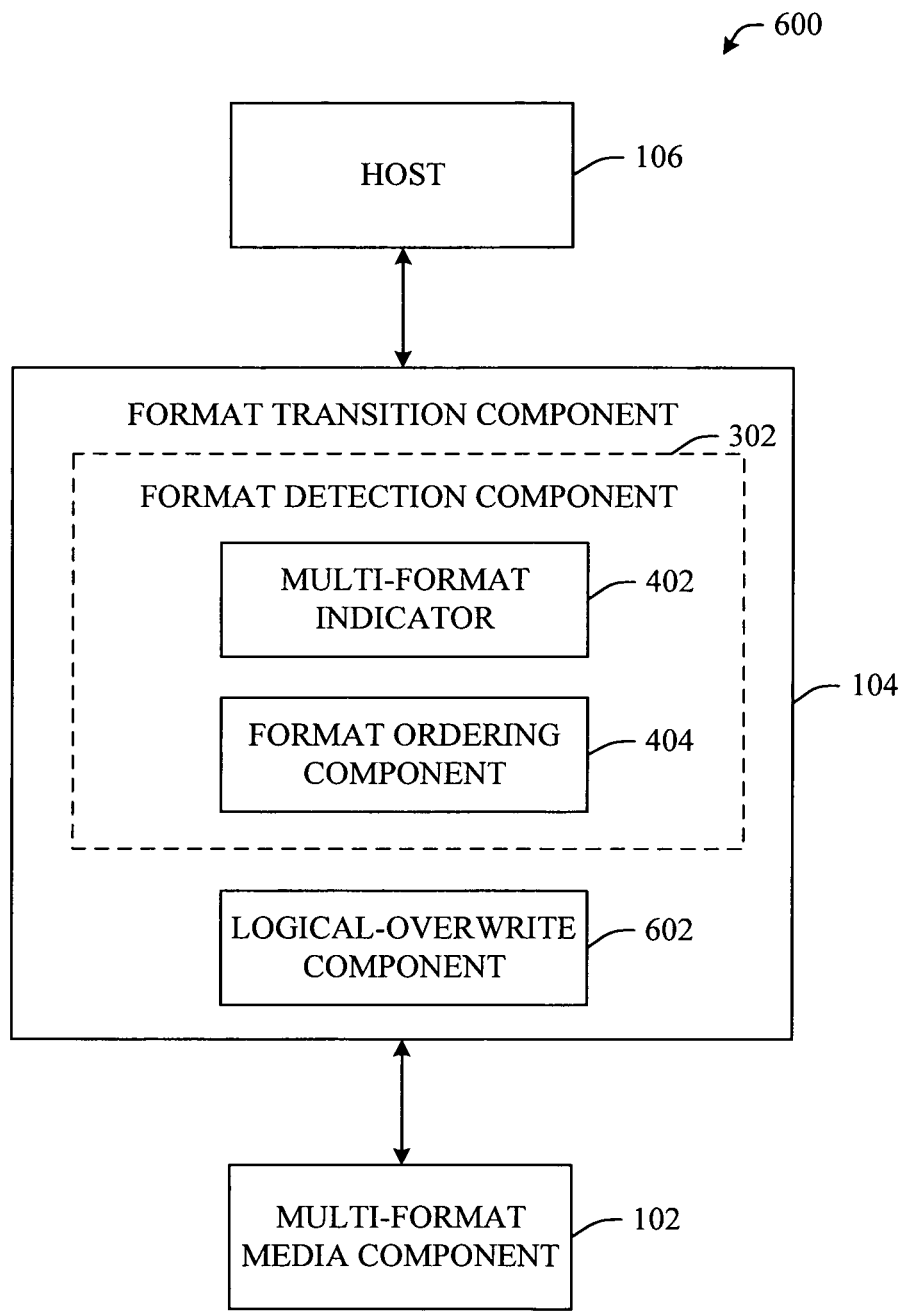
FIG. 6 illustrates a block diagram of a system that employs a logical-overwrite technique to effect backwards compatibility in accordance with an aspect of the innovation.

FIG. 6 illustrates an alternate system 600 in accordance with a pseudo- or logical-overwrite aspect of the innovation. It will be understood and appreciated that this logical overwrite system 600 is most often employed if the multi-session system 500 of FIG. 5 is not permitted by specification. In other words, the logical-overwrite system is most often employed when there is no possibility to use session switching to get to a file system in an earlier layer. In these scenarios, files will be set when the disc is mastered. In the example, the logical-overwrite component 602 can be employed to redirect file system structures from disparate layers.

Figure 7:
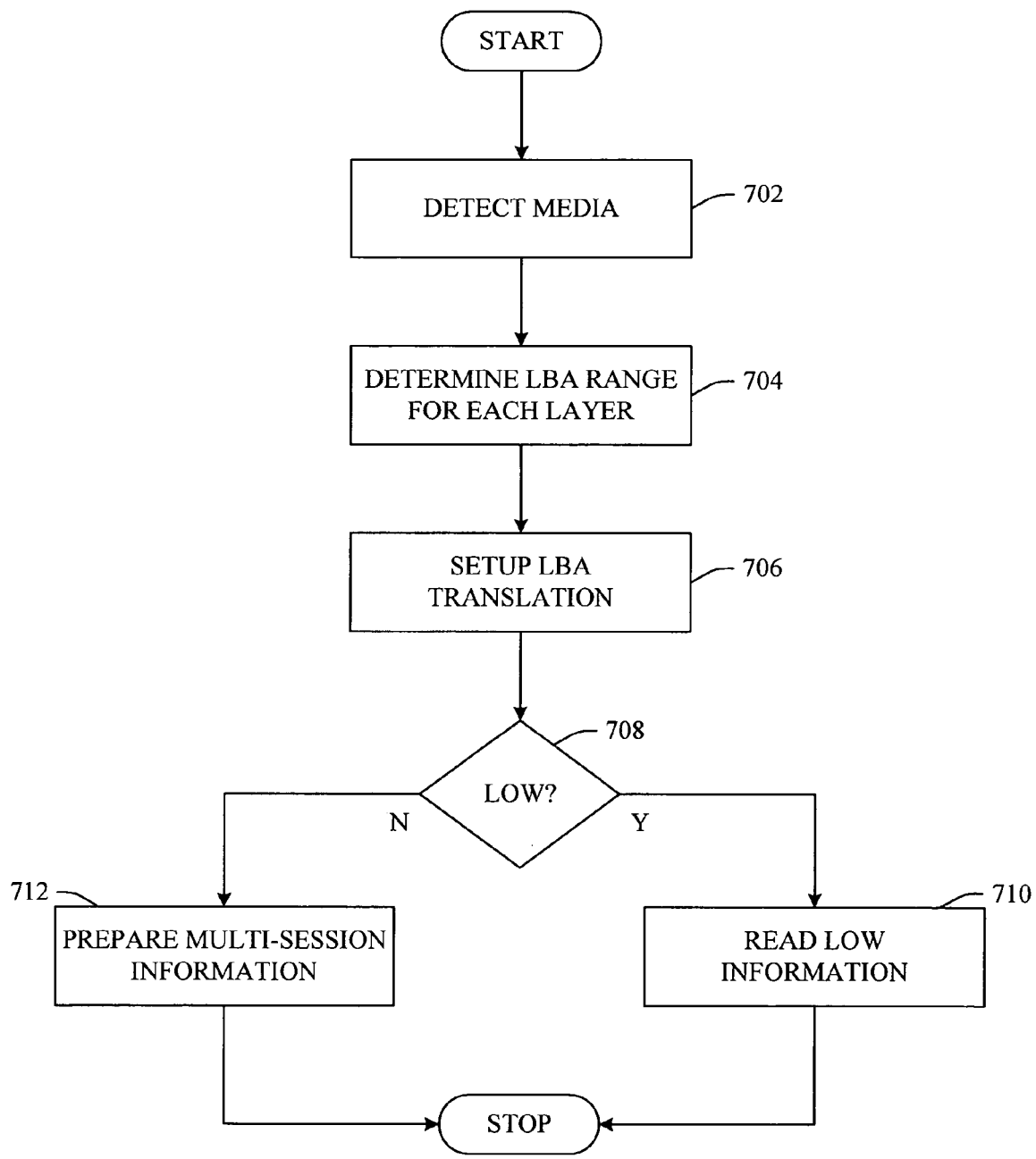
FIG. 7 a representative flow diagram illustrating defining a logical block address range that facilitates backwards compatibility of disparate formats in accordance with an aspect of the novel innovation.

FIG. 7 illustrates a methodology of facilitating compatibility of a multi-format media in accordance with an aspect of the innovation. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 702, media of a hybrid disc is detected. It will be understood that the methodology of FIG. 7 can be indicative of the behavior of a logical unit (e.g., drive) in accordance with an aspect of the innovation. Once identified, at 704 the corresponding LBA range for each supported layer is determined. As described supra, this information can be identified in the lead-in area of some or all of the layers. As well, a rules-based logic can be employed to pre-determine and pre-identify LBA ranges based upon format type.

At 706, the identified LBAs are translated to determine a corresponding physical disc location. Next, at 708, a determination is made if a logical overwrite mechanism is to be employed. If so, at 710, the logical overwrite information is read. If not, at 712, multi-session information is prepared.

Conventional proposals for multi-format (e.g., HD-DVD and DVD-Video) hybrid disc include a requirement to employ a method to "swap" from using a first layer to using a second layer, e.g., HD-DVD layer to using the DVD-Video layer. As stated above, the PC environment creates many obstacles not experienced in the consumer electronics industry. For example, when working in a PC environment, it is not acceptable to change the data returned by commands (such as READIO) without being sure of exclusive access.

Figure 8:
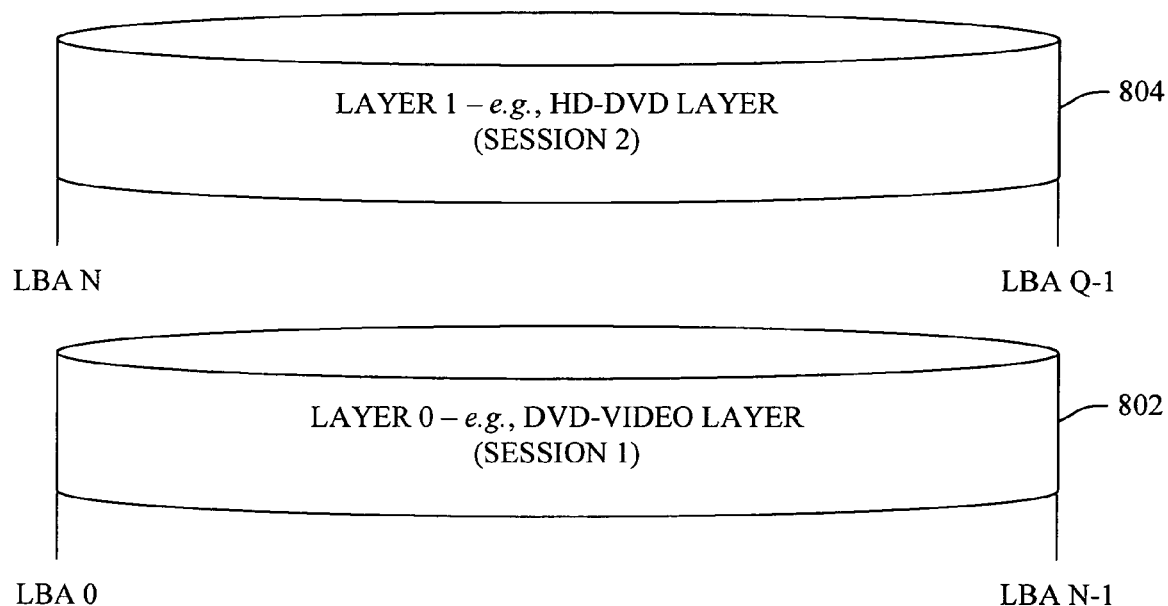
FIG. 8 illustrates a graphical representation of a multi-session two physical layer optical disc in accordance with an aspect of the innovation.

FIG. 8 is provided to add context to the multi-session scenario described supra. As illustrated in FIG. 8, Layer 0 (e.g., Session 1, DVD-Video layer 802) can be designated at LBA 0 through N−1. Similarly, Layer 1 (e.g., Session 2, HD-DVD layer 804) can be designated at LBA N to Q−1. Although only two layers are illustrated in FIG. 8, it is to be understood and appreciated that any number of layers can exist without departing from the spirit and scope of the invention and claims appended hereto.

By design, this multi-session scenario leverages the fact that existing file system implementation will load the file system from the "last" session of the disc. Therefore, a drive would only have to report each unique layer (e.g., 802, 804) it knew of as a "session" and perform a complex LBA physical address translation. In addition, the media can be marked to indicate that it is using two physical formats. As described supra with respect to FIG. 4, a multi-format indicator 402 (e.g., flag) can be employed to facilitate this indication.

Although the aspect shown in FIG. 8 employs DVD-Video and HD-DVD formats, it is to be understood that this solution is not restricted to these specific formats. As such, any combination of available formats can be employed in accordance with this novel innovation. As well, any number of physical layers can be employed (e.g., 1, 2, 3 . . . ) in accordance with alternative aspects.

Figure 9:
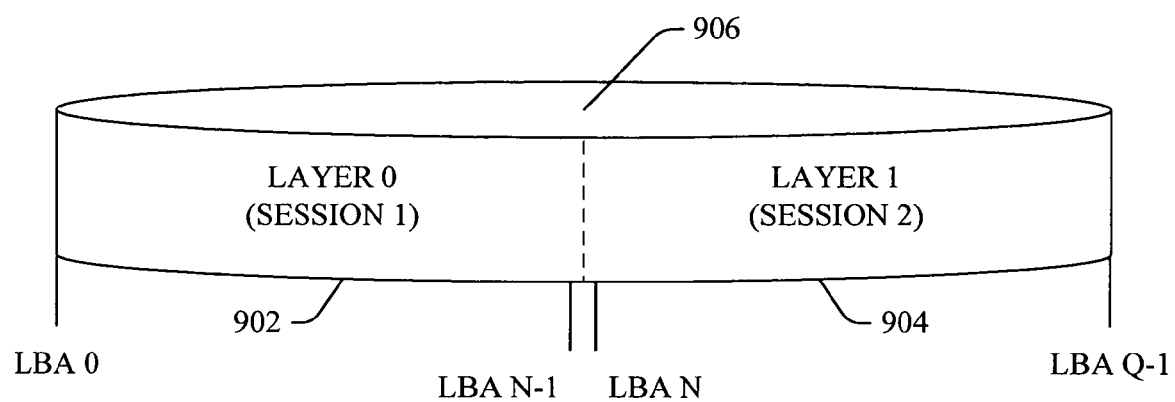
FIG. 9 illustrates a graphical representation of a multi-session single physical layer optical disc in accordance with an aspect of the innovation.

Turning now to FIG. 9, an alternative configuration of multiple sessions is shown. For example, alternate methods include having the two areas on one layer. As shown, layer 0 (e.g., Session 1, DVD-Video layer 902) and layer 1 (e.g., Session 2, HD-DVD layer 904) can be embedded upon the same physical layer 906.

Figure 10A:
FIG. 10A illustrates a simple linear arrangement of three formats in accordance with an aspect of the innovation.
Figure 10B:
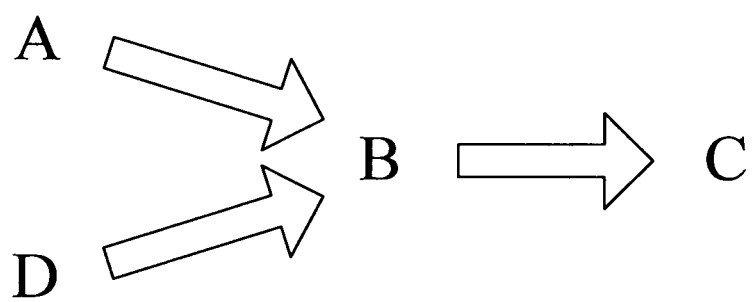
FIG. 10B illustrates a simple tree arrangement of four formats in accordance with an aspect of the innovation.
Figure 10C:
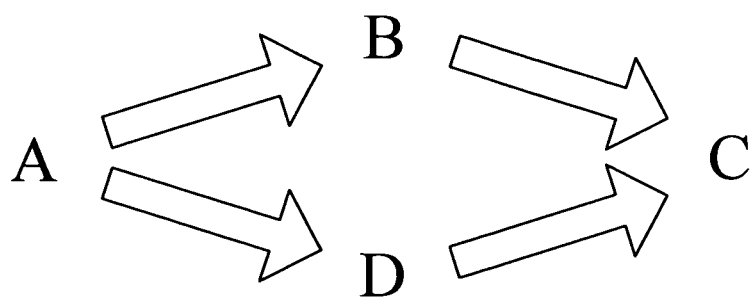
FIG. 10C illustrates a complex tree arrangement of four formats in accordance with an aspect of the innovation.

As stated above, the novel innovation is not strictly limited the DVD-Video and HD-DVD aspects shown in FIGS. 8 and 9. Rather, novelty of the invention can be employed with any type and/or quantity of types of media. FIGS. 10A through 10C illustrate a number of various combinations possible, as well as their caveats. While the aspects illustrated herein are included to provide context to alternative aspects, they are not intended to be limiting in any way. As well, it is to be appreciated that the number of scenarios are endless and that these scenarios are to be included within the scope of this disclosure and claims appended hereto.

Referring initially to the linear aspect illustrated in FIG. 10A, area A is a newest (or most recent) format that requires an ability to handle formats B and C reading/supporting A. Area B is a second (mid) format and implies support of legacy format C. As will be appreciated, this may be considered one of the most flexible and easiest setups to author.

In operation, the file system in area A (e.g., Session 3) can refer to any subset of files contained in area B and/or C. Similarly, area B can refer to files contained in area C. Finally, area C, which can also be considered Session 1, can only refer to files in its own area. As described earlier, most frequently the LBA ranges of areas A, B and C are contiguous. However, continuity of each session's LBA range is not a requirement.

Referring now to FIG. 10B, this simple tree structure is similar to the linear structure of FIG. 10A. The only difference is that two (typically exclusive) options exist for Session 3 (e.g., area A or D). In accordance with the simple tree structure of FIG. 10B, there are no new file system or LBA restrictions. In other words, the file system follows the illustrated arrows, same with LBA range.

FIG. 10C illustrates a complex graph of multiple areas. In accordance with the complex tree of FIG. 10C, a new restriction of size B equal to size D is added. This structure ensures that regardless of whether B or D is used, area A's files will exist at the same LBA range. Effectively, this restriction guarantees that A's LBA range is static.

In accordance with the complex tree of FIG. 10C, two alternatives exist for the file system also. The first option is to have "mirror" file systems in areas B and D. This scenario deems the fewest restrictions on the file system in area A. Alternately, a subset of the files (including an empty set) can be mirrored between B and D. In either case, only mirrored files must exist at the same LBA range in both areas.

It should be noted that any single area in the diagrams shown in FIGS. 10A through 10C can be replaced with two areas, using either simple tree or complex graph semantics as appropriate. Furthermore, any area may be replaced with any length linear graph without any additional restrictions. These additional configurations are to be included within the scope of this disclosure and claims appended hereto.

With reference to the session numbers, graphically speaking, the "root" nodes (C in the above) are always deemed as Session 1. In the exemplary aspects, each arrow (one per area) adds one to the resulting session number. Given the rules described in accordance with this aspect, the session numbers for each sample graph described above (e.g., FIGS. 10A, 10B and 10C) would be as follows:

|  | Area A | Area B | Area C | Area D |
| --- | --- | --- | --- | --- |
| Linear | 3 | 2 | 1 | N/A |
| Simple Tree | 3 | 2 | 1 | 3 |
| Complex | 3 | 2 | 1 | 2 |

Figure 11:
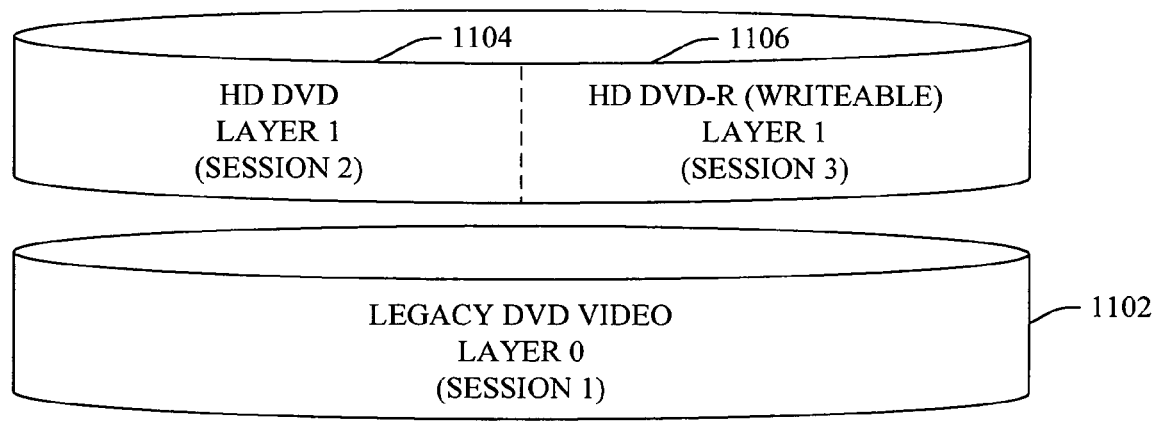
FIG. 11 illustrates a graphical representation of a multi-session two physical layer optical disc having a writable area in accordance with the innovation.

The method of multi-session for multi-format also enables media with read-only and writable areas. A simple example is as illustrated in FIG. 11. As shown, area 1102 is representative of layer 0 (e.g., Session 1, Legacy DVD-Video). Layer 1 can be segmented into two disparate areas as shown. First, layer 1 can include a Session 2, HD-DVD area 1104. Additionally, HD-DVD-R (writeable) area 1106 can be included as area 1106.

Figure 12:
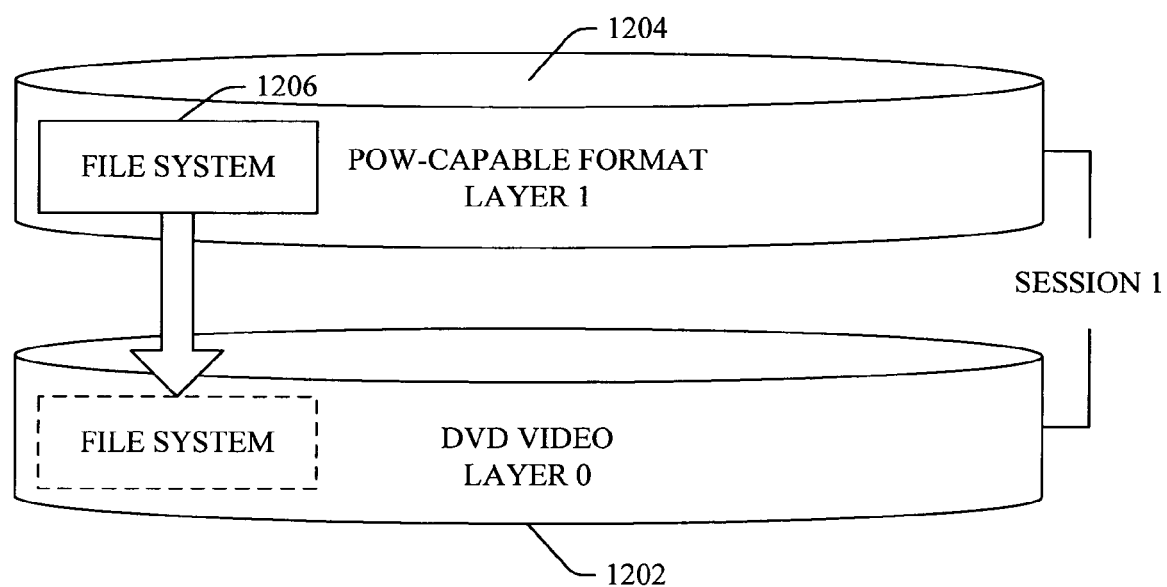
FIG. 12 illustrates a graphical representation of a two physical layer optical disc that employs logical-overwrite in accordance with an aspect of the innovation.

Turning now to FIG. 12, an aspect that employs pseudo-overwrite (POW) in accordance with the novel innovation is shown. For example, drives which support the notation of POW can totally avoid the concept of multi-session. For example, this may be desirable or required by certain file system implementations.

Continuing with the example of FIG. 11, this structure can become a single session disc (e.g., Session 1), in a POW capable drive. It will be appreciated that this single session is possible due to the POW capability of the system. In other words, this POW capability can ensure that the file system is always found at the original LBA, even though it is actually read from the second layer (e.g., layer 1 of FIG. 12). As stated previously, although the aspect of FIG. 12 illustrates only two disparate format layers, it is to be understood and appreciated that other aspects exist that employ more than two layers (as well as writable areas). These additional aspects are to be considered a part of the disclosure and claims appended hereto.

There is at least one additional expansion that can be made to this idea, which is the "virtualization" of areas that the drive cannot recognize. For example, given the graph illustrated in FIG. 13A, it is possible to "virtualize" area C. That is, if the drive cannot recognize or use area B, it simply returns data of a known pattern (such as all zeros) or an error when the given LBA range is accessed. As shown, this restricts the file system in A, without additional work in the file system.

Figure 13A:
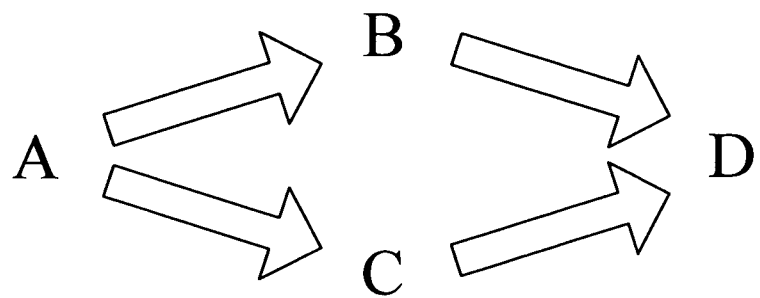
FIG. 13A is a layer configuration diagram that employs "virtualization" concepts in accordance with an aspect of the innovation.
Figure 13B:
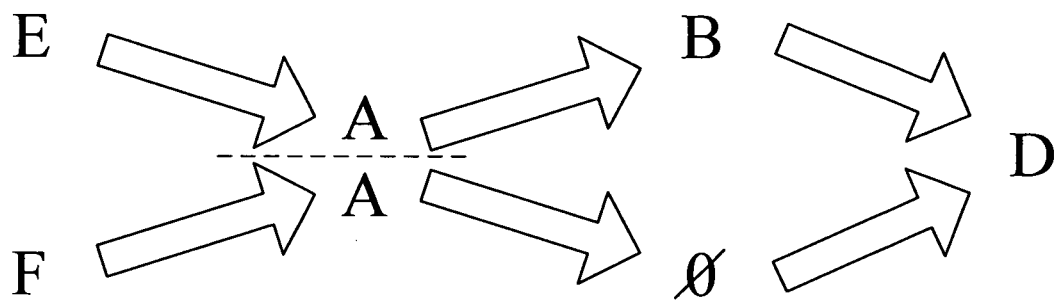
FIG. 13B is a layer configuration diagram that employs "virtualization" concepts in accordance with an aspect of the innovation.
Figure 13C:
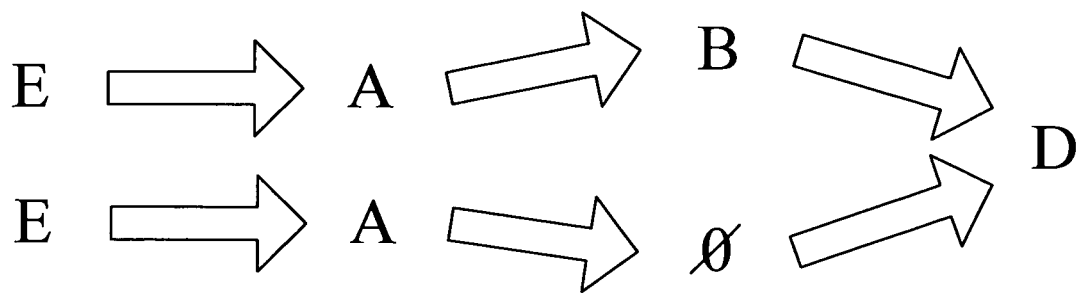
FIG. 13C is a layer configuration diagram that simplifies the representation of the configuration of FIG. 13B.

One work around is to create a graph as shown in FIG. 13B. As shown, "Ø" refers to a virtualized area and the dotted line for area A is illustrative of the characteristic that E can go through A only to B (not through Ø). Similarly, F can go through A only to Ø. It is to be understood that the tree shown in FIG. 13B can also have been drawn as the tree shown in FIG. 13C. This removes the file system restrictions by using the additional areas A and E to hold file systems unique to the path used by the logical unit.

Figure 14A:
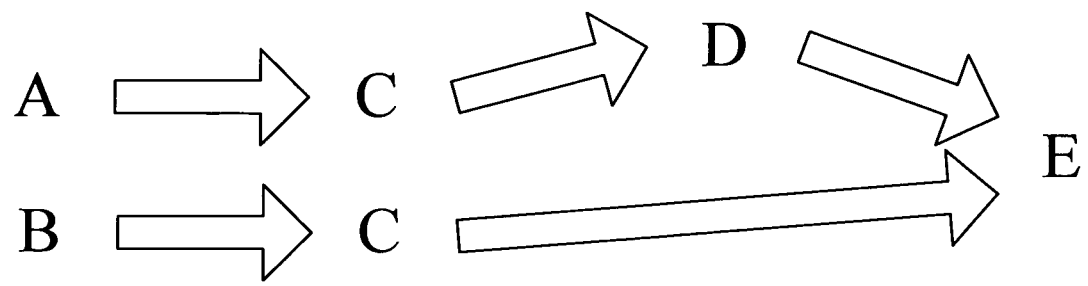
FIG. 14A is a graphical configuration diagram of a pseudo-overwrite layer arrangement in accordance with an aspect of the innovation.
Figure 14B:
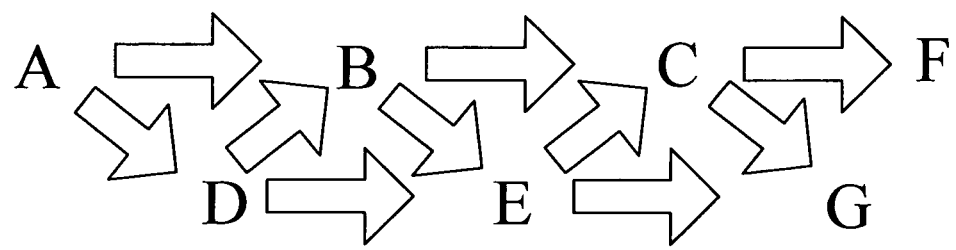
FIG. 14B is a graphical configuration diagram of a pseudo-overwrite layer arrangement in accordance with an aspect of the innovation.

Referring now to FIGS. 14A and 14B, alternative POW-enabled area graphs are shown. Effectively, the use of POW can enable/remove an earlier discussed potential restriction, equal path lengths. Specifically, due to the characteristic of a single session in a POW scenario, the path lengths no longer need to be balanced. As well, any type of mixing or even reuse of areas can be permitted, so long as appropriate POW structures are applied to ensure a coherent file system.

Turning first to FIG. 14A, in this example, the A→C→D→E path can be multi-session based, and the B→C→E path can be considered to have POW structures in area B to indicate that files in area C are in appropriate locations. Even the POW work is not required if no embedded LBA exists in areas C. Therefore, for most cases, it can even be possible to have other graphs, so long as a unique POW structure exists for each path.

The graph illustrated in FIG. 14B has many paths. Any path which is authored to be valid can be made to be valid with the use of POW to map any area's sectors as the file system. It will be appreciated that this is identical in concept to creating virtual area prior to A via POW for each path.

It is to be understood that POW can be employed generally. POW allows avoiding "multi-session" by fixing the anchor located at the start of a disc (e.g., typically sector 256) to point to some other location. Therefore, POW can also make possible one media with multiple viewable file systems, based on other criteria (e.g., drive-loaded, digital rights management (DRM)) to have the drive allow access to each area. Although, this approach may not get any additional protection with regard to encrypted content on the media, it can serve to hide the existence of data from consumer drives.

Figure 15:
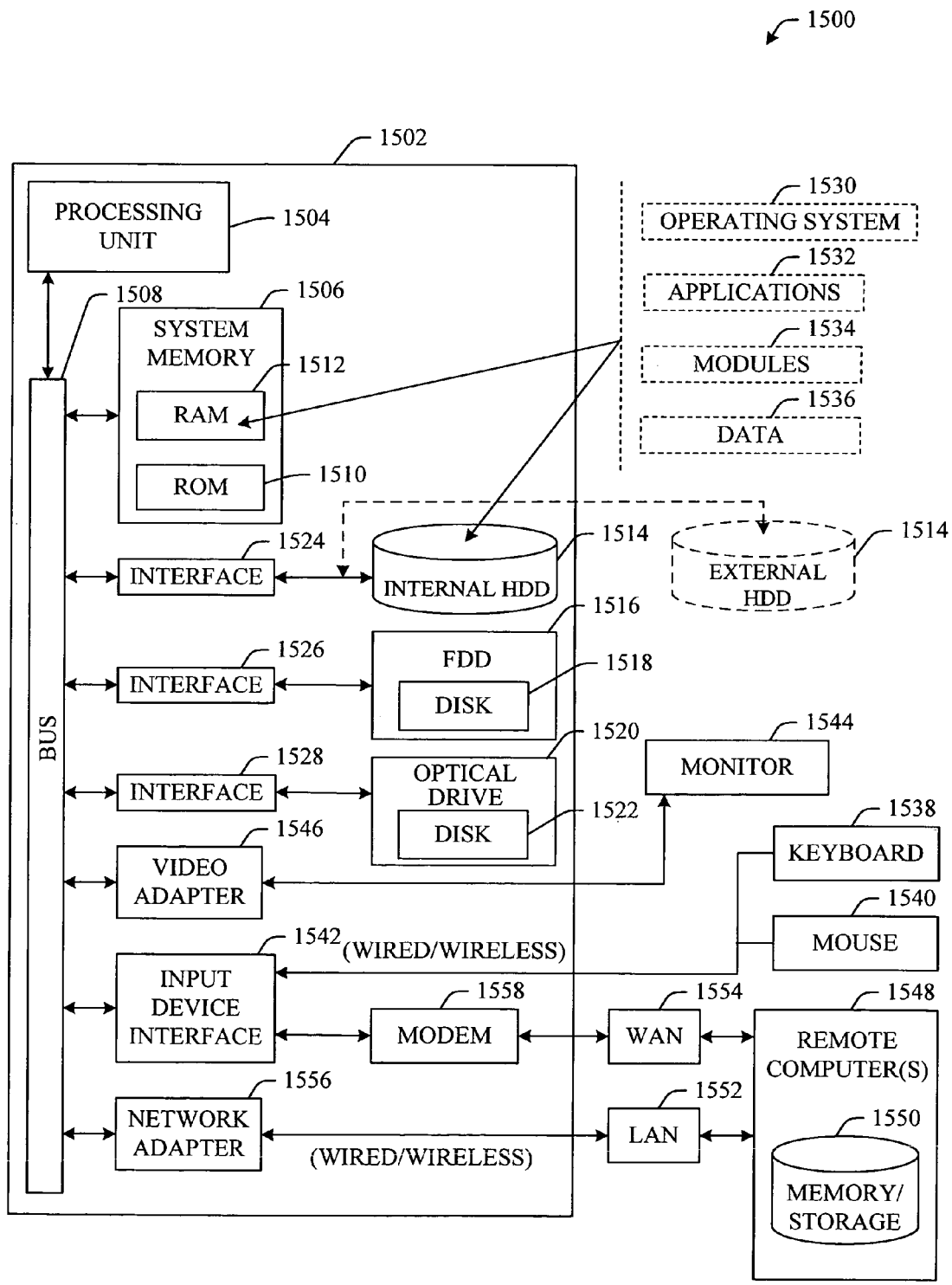
FIG. 15 illustrates a block diagram of a computer operable to execute the disclosed architecture.

Referring now to FIG. 15, there is illustrated a block diagram of a computer operable to execute the disclosed architecture of facilitating backwards compatibility in a multi-format optical disc environment. In order to provide additional context for various aspects of the subject invention, FIG. 15 and the following discussion are intended to provide a brief, general description of a suitable computing environment 1500 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 15, the exemplary environment 1500 for implementing various aspects of the invention includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures may also be employed as the processing unit 1504.

The system bus 1508 can be any of several types of bus structure that may further interconnect to a memory bus (with or without a memory controller), a peripheral bus, and a local bus using any of a variety of commercially available bus architectures. The system memory 1506 includes read-only memory (ROM) 1510 and random access memory (RAM) 1512. A basic input/output system (BIOS) is stored in a non-volatile memory 1510 such as ROM, EPROM, EEPROM, which BIOS contains the basic routines that help to transfer information between elements within the computer 1502, such as during start-up. The RAM 1512 can also include a high-speed RAM such as static RAM for caching data.

The computer 1502 further includes an internal hard disk drive (HDD) 1514 (e.g., EIDE, SATA), which internal hard disk drive 1514 may also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE 1394 interface technologies. Other external drive connection technologies are within contemplation of the subject invention.

The drives and their associated computer-readable media provide nonvolatile storage of data, data structures, computer-executable instructions, and so forth. For the computer 1502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is appreciated that the invention can be implemented with various commercially available operating systems or combinations of operating systems.

A user can enter commands and information into the computer 1502 through one or more wired/wireless input devices, e.g., a keyboard 1538 and a pointing device, such as a mouse 1540. Other input devices (not shown) may include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE 1394 serial port, a game port, a USB port, an IR interface, etc.

A monitor 1544 or other type of display device is also connected to the system bus 1508 via an interface, such as a video adapter 1546. In addition to the monitor 1544, a computer typically includes other peripheral output devices (not shown), such as speakers, printers, etc.

The computer 1502 may operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices and companies, and facilitate enterprise-wide computer networks, such as intranets, all of which may connect to a global communications network, e.g., the Internet.

When used in a LAN networking environment, the computer 1502 is connected to the local network 1552 through a wired and/or wireless communication network interface or adapter 1556. The adapter 1556 may facilitate wired or wireless communication to the LAN 1552, which may also include a wireless access point disposed thereon for communicating with the wireless adapter 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 via the serial port interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 16:
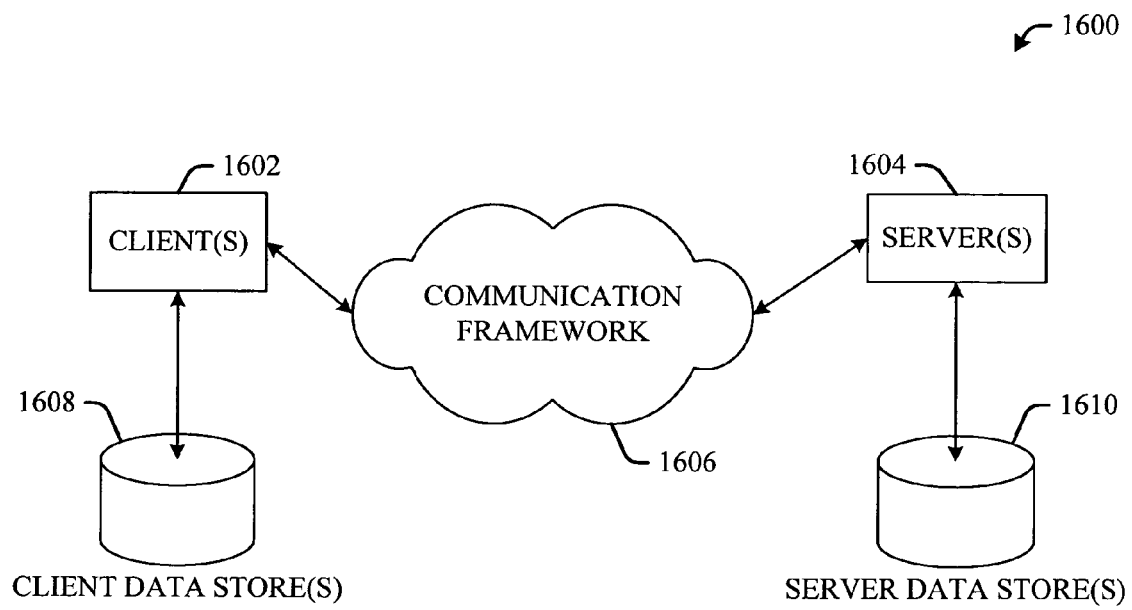
FIG. 16 illustrates a schematic block diagram of an exemplary computing environment in accordance with the subject invention.

Referring now to FIG. 16, there is illustrated a schematic block diagram of an exemplary computing environment 1600 in accordance with the subject invention. The system 1600 includes one or more client(s) 1602. The client(s) 1602 can be hardware and/or software (e.g., threads, processes, computing devices). The client(s) 1602 can house cookie(s) and/or associated contextual information by employing the invention, for example.

The system 1600 also includes one or more server(s) 1604. The server(s) 1604 can also be hardware and/or software (e.g., threads, processes, computing devices). The servers 1604 can house threads to perform transformations by employing the invention, for example. One possible communication between a client 1602 and a server 1604 can be in the form of a data packet adapted to be transmitted between two or more computer processes. The data packet may include a cookie and/or associated contextual information, for example. The system 1600 includes a communication framework 1606 (e.g., a global communication network such as the Internet) that can be employed to facilitate communications between the client(s) 1602 and the server(s) 1604.

Communications can be facilitated via a wired (including optical fiber) and/or wireless technology. The client(s) 1602 are operatively connected to one or more client data store(s) 1608 that can be employed to store information local to the client(s) 1602 (e.g., cookie(s) and/or associated contextual information). Similarly, the server(s) 1604 are operatively connected to one or more server data store(s) 1610 that can be employed to store information local to the servers 1604.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates backwards compatibility with respect to a multi-format media component having data stored thereon in at least two disparate formats, comprising:
a format transition component configured to restrict access to at least a subset of the data stored on the multi-format media component until a desired authentication between a host and a drive occurs and to enable backwards compatibility between the at least two disparate formats,
a first physical layer of the multi-format media component being rewriteable and conforming to a first format of the at least two disparate formats, and
a second physical layer of the multi-format media component being read-only and conforming to a second format of the at least two disparate formats, the first format backwards compatible with the second format and the second physical layer being read-only to inhibit data associated with the second format and referenced by data associated with the first format from being overwritten to facilitate the backwards compatibility; and
a format detection component configured to employ a multi-session technique to organize the first format and the second format, the first format organized into a first session comprising a first set of logical block addresses (LBAs) and the second format organized into a second session comprising a second set of LBAs, the first set of LBAs and the second set of LBAs part of a single LBA addressing range.

2. The system of claim 1, the first format corresponding to a Blue-Laser format and the second format corresponding to a DVD-Video format.

3. The system of claim 1, the format detection component configured to employ an indicator that identifies the presence of at least one of the first format or the second format.

4. The system of claim 1, the first set of LBAs comprising a first portion of the single LBA addressing range and the second set of LBAs comprising a second portion of the single LBA addressing range, the first portion being a numerically higher portion of the single LBA addressing range relative to the second portion.

5. The system of claim 1, the second set of LBAs not overlapping the first set of LBAs.

6. The system of claim 1, the format transition component comprising an automatic switching instruction that effectuates a transition between the first format and the second format.

7. The system of claim 1, comprising a logical-overwrite component configured to acknowledge an inability to write over a sector of the second physical layer and redirect a write request to an alternative sector of the first physical layer.

8. The system of claim 7, the logical-overwrite component configured to facilitate an indication that the sector unable to be written over is overwritten.

9. The system of claim 1, the first set of LBAs comprising a first portion of the single LBA addressing range and the second set of LBAs comprising a second portion of the single LBA addressing range, the second portion contiguous with the first portion.

10. The system of claim 9, the first portion being a numerically higher portion of the single LBA addressing range relative to the second portion.

11. A method that facilitates backwards compatibility of a multi-format media, comprising:
restricting access to at least a subset of data stored on a multi-format media component until a desired authentication between a host and a drive occurs, the multi-format media component comprising at least two groups of physical layers, a first group of one or more physical layers being rewriteable and conforming to a first format and a second group of one or more physical layers being read-only and conforming to a second format, the first format different than the second format;
providing access to the multi-format media component responsive to the desired authentication occurring; and
employing a multi-session technique to organize the first format and the second format and to enable a concurrent view of data stored in the first group and data stored in the second group, the first format organized into a first session comprising a first set of logical block addresses (LBAs) and the second format organized into a second session comprising a second set of LBAs, the first set of LBAs and the second set of LBAs part of a single LBA addressing range, the first set of LBAs not overlapping the second set of LBAs and the first set of LBAs being numerically higher than the second set of LBAs to inhibit data associated with the second format and referenced by data associated with the first format from being overwritten.

12. The method of claim 11, at least one of:
the first set of LBAs comprising a first numerically contiguous set of LBAs; or
the second set of LBAs comprising a second numerically contiguous set of LBAs.

13. The method of claim 11, the first format backwards compatible with the second format, such that a device configured to read the first format is also configured to read the second format but that a device configured to read the second format is not configured to read the first format.

14. The method of claim 11, the second format corresponding a legacy format of the first format.

15. The method of claim 11, the first format corresponding to a Blue-Laser format.

16. The method of claim 11, comprising indicating a detection of at least one of the first format or the second format.

17. The method of claim 15, the second format corresponding to a DVD-Video format.

18. The method of claim 11, comprising:
receiving a write request to write over a sector of at least a first physical layer of the second group;
acknowledging an inability to write over the sector; and
redirecting the write request to an alternative sector of at least a second physical layer of the first group.

19. The method of claim 18, comprising facilitating an indication that the sector is overwritten.

20. A system that facilitates backwards compatibility with respect to a multi-format media component having data stored thereon in at least two disparate formats, comprising:
a format transition component configured to enable backwards compatibility between the at least two disparate formats,
a first physical layer of the multi-format media component being rewriteable and conforming to a first format of the at least two disparate formats, and
a second physical layer of the multi-format media component being read-only and conforming to a second format of the at least two disparate formats, the first format backwards compatible with the second format and the second physical layer being read-only to inhibit data associated with the second format and referenced by data associated with the first format from being overwritten to facilitate the backwards compatibility;

a format detection component configured to employ a multi-session technique to organize the first format and the second format, the first format organized into a first session comprising a first set of logical block addresses (LBAs) and the second format organized into a second session comprising a second set of LBAs, the first set of LBAs and the second set of LBAs part of a single LBA addressing range; and a logical-overwrite component configured to acknowledge an inability to write over a sector of the second physical layer and redirect a write request to an alternative sector of the first physical layer.

21. The system of claim 20, the format transition component configured to restrict access to at least a subset of the data stored on the multi-format media component until a desired authentication between a host and a drive occurs.

22. The system of claim 20, the first format backwards compatible with the second format, such that a device configured to read the first format is also configured to read the second format but that a device configured to read the second format is not configured to read the first format.

23. The system of claim 20, the logical-overwrite component configured to facilitate an indication that the sector unable to be written over is overwritten.

* * * * *